(12) United States Patent
Shimizu et al.

(10) Patent No.: US 6,627,301 B2
(45) Date of Patent: Sep. 30, 2003

(54) MAGNETIC RECORDING MEDIUM

(75) Inventors: Kenji Shimizu, Chiba (JP); Akira Itoh, Kanagawa (JP); Hiroshi Sakai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 98 days.

(21) Appl. No.: 09/818,942

(22) Filed: Mar. 28, 2001

(65) Prior Publication Data

US 2002/0012816 A1 Jan. 31, 2002

Related U.S. Application Data (60) Provisional application No. 60/192,546, filed on Mar. 28, 2000.

(51) Int. Cl.[7] .............................. G11B 5/66; G11B 5/70; H01J 1/00; C25D 5/24; B32B 15/01
(52) U.S. Cl. ...................... 428/212; 428/611; 428/669; 428/670; 428/681; 428/694 TM; 428/900
(58) Field of Search .................. 428/694 TM, 212, 428/900, 611, 669, 670, 681

(56) References Cited

U.S. PATENT DOCUMENTS

| | | |
|---|---|---|
| 5,063,120 A | * 11/1991 | Edmonson et al. ...... 428/694 T |
| 6,212,025 B1 | * 4/2001 | Ichihara et al. ............... 360/55 |
| 6,403,203 B2 | * 6/2002 | Futamoto et al. ........... 428/212 |
| 6,426,157 B1 | * 7/2002 | Hokkyo et al. ...... 428/694 TM |
| 2001/0009730 A1 | 7/2001 | Futamoto et al. .... 428/694 TM |

FOREIGN PATENT DOCUMENTS

| | | |
|---|---|---|
| JP | 9-91660 A | 4/1997 |
| JP | 10-3334440 A | 12/1998 |

OTHER PUBLICATIONS

Patent Abstracts of Japan, abstracting JP–A–9–91660 of Apr. 4, 1997.
Patent Abstracts of Japan, abstracting JP–A–10–334440 of Dec. 18, 1998.

* cited by examiner

*Primary Examiner*—Holly Rickman
(74) *Attorney, Agent, or Firm*—Sughrue Mion, PLLC (57) ABSTRACT

The present invention provides a magnetic recording medium exhibiting excellent noise characteristics and thermal stability. On a substrate, a first undercoat film, a first perpendicular magnetic film, a second undercoat film, a non-magnetic intermediate film, a second perpendicular magnetic film, and a protective film are successively formed, and the magnetic anisotropy energy of the first perpendicular magnetic film is higher than that of the second perpendicular magnetic film.

17 Claims, 1 Drawing Sheet

MAGNETIC RECORDING MEDIUM

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/192,546 filed Mar. 28, 2000 pursuant to 35 U.S.C. §111(b).

FIELD OF THE INVENTION

The present invention relates to a magnetic recording medium which is employed in a magnetic disk apparatus and the like.

BACKGROUND OF THE INVENTION

A widely employed magnetic recording medium is of an in-plane recording type in which most of the easy-magnetization axes in the magnetic film are oriented horizontally with respect to the substrate. However, in such an in-plane magnetic recording medium, per-bit volume becomes exceedingly small and read-write characteristics may deteriorate when recording density is increased.

In contrast, in a perpendicular magnetic recording medium, in which most of the easy-magnetization axes in the magnetic film are oriented vertically with respect to the substrate, recording density can be increased without deterioration of read-write characteristics. Therefore, a perpendicular magnetic recording medium has recently become of interest, and magnetic recording medium structures suitable for perpendicular magnetic recording have been proposed.

For example, Japanese Patent Application Laid-Open (Kokai) Nos. 58-77025 and 58-141435 disclose that Ti is employed as a material for producing an undercoat layer of a perpendicular magnetic film comprising a Co alloy material. In addition, Japanese Patent Application Laid-Open (Kokai) No. 8-180360 discloses that an alloy of Co and Ru is employed as a material for producing the undercoat layer.

In recent years, there has been demand for magnetic recording media of higher recording density, and in accordance with this trend, improvement of noise characteristics has been required. However, conventional magnetic recording media are not necessarily satisfactory in terms of noise characteristics, and thus there has been demand for a magnetic recording medium that exhibits excellent noise characteristics.

Meanwhile, in a conventional magnetic recording medium, particularly when recording density is increased, a thermal fluctuation phenomenon may arise. The term "thermal fluctuation phenomenon" refers to a phenomenon in which recording bits become unstable and recorded data are lost thermally. When such a phenomenon occurs, read-write output of recorded data may lessen with passage of time in a magnetic recording apparatus.

In view of the foregoing, an object of the present invention is to provide a magnetic recording medium which exhibits excellent noise characteristics and rarely causes a thermal fluctuation phenomenon.

SUMMARY OF THE INVENTION

The present invention provides a magnetic recording medium comprising a substrate, a first perpendicular magnetic film, and a second perpendicular magnetic film in order, wherein the magnetic anisotropy energy of the first perpendicular magnetic film is higher than that of the second perpendicular magnetic film.

Preferably, the first perpendicular magnetic film has a magnetic anisotropy energy of $5 \times 10^6$ erg/cc or more.

Preferably, the ratio of residual magnetization to saturation magnetization in the first perpendicular magnetic film is 0.9 or more.

The first perpendicular magnetic film may be a multi-layer film in which layers of Co material, and Pt or Pd material are repeatedly stacked; an amorphous film containing a rare earth element; or an ordered alloy, e.g., $L1_0$-structured FePt, CoPt, $(Fe_{(1-n)}Co_n)_{50} Pt_{50}$ (n: 0–0.99).

Preferably, the first perpendicular magnetic film has a thickness of 1–175 Å, more preferably 1–100 Å.

Preferably, the second perpendicular magnetic film comprises any alloy of CoCrPt, CoCrTa, and CoCrPtX (X: one or more species selected from among Ta, Zr, Cu, Re, Nb, Si, Ge, and B).

In the magnetic recording medium of the present invention, a non-magnetic intermediate film of hcp structure may be provided under the second perpendicular magnetic film.

DESCRIPTION OF THE PREFERRED EMBODIMENTS

Figure 1:
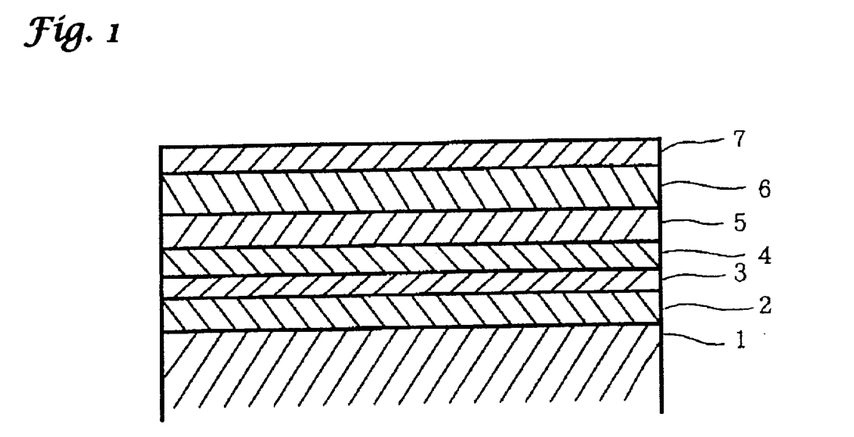
FIG. 1 is a partial sectional view showing an embodiment of the magnetic recording medium of the present invention.

FIG. 1 is a schematic representation showing an embodiment of the magnetic recording medium of the present invention. The magnetic recording medium shown in FIG. 1 comprises a substrate 1, a first undercoat film 2, a first perpendicular magnetic film 3, a second undercoat film 4, a non-magnetic intermediate film 5, a second perpendicular magnetic film 6, and a protective film 7, the films 2 to 7 being successively formed on the substrate 1.

The substrate 1 may be an aluminum alloy substrate on which an NiP plating film is formed, which is generally employed as a substrate for magnetic recording media; or a substrate of glass, ceramic, carbon, or flexible resin, which substrate may be coated with an NiP film through plating or sputtering.

The first undercoat film 2 is provided to enhance the perpendicular magnetic anisotropy of the first perpendicular magnetic film 3, and may be formed of SiN, Pd, C, Cu, Pt or MgO. The first undercoat film 2 has a thickness of 1,000 Å or less.

In an embodiment of the present invention, the first undercoat film may be omitted.

The first perpendicular magnetic film 3 is a film formed of magnetic material, in which most of the easy-magnetization axes are oriented vertically with respect to the substrate.

The first perpendicular magnetic film 3 may be a multi-layer film in which layers of Co material, and Pt or Pd material are stacked repeatedly.

Co material may be Co, a CoCr alloy, a CoCrPt alloy, a CoCrTa alloy, a CoCrPtX' alloy (X': one or more species selected from among Ta, Zr, Nb, Cu, Re, Ni, and B), or $CoSiO_2$ alloy.

Pt material may be Pt or a Pt alloy. Pd material may be Pd or a Pd alloy.

The first perpendicular magnetic film 3 may be an amorphous film containing a rare earth element; for example, an amorphous film formed of TbFeCo, GdCo, or NdDyFeCo or an ordered alloy, e.g., $L1_0$-structured FePt, CoPt, $(Fe_{(1-n)}Co_n)_{50}Pt_{50}$ (n: 0–0.99).

The ratio of residual magnetization to saturation magnetization (hereinafter referred to as "Mr/Ms") in the first perpendicular magnetic film 3 is preferably 0.9 or more. When Mr/Ms falls within the above range, the gradient in the vicinity of residual magnetization becomes small in the hysteresis, and demagnetization rarely occurs.

The first perpendicular magnetic film 3 preferably has a thickness of 1–175 Å, more preferably 1–100 Å.

When the thickness is below the above range, insufficient magnetic flux is obtained, which induces a reduction in read-write output and deterioration of noise characteristics such as SNR. In contrast, when the thickness exceeds the above range, medium noise increases due to exchange bonding in the first perpendicular magnetic film 3.

In the magnetic recording medium of an embodiment of the present invention, the first perpendicular magnetic film 3 is a high-magnetic-anisotropy film in which the magnetic anisotropy energy is determined to be higher than that of the second perpendicular magnetic film 6.

The first perpendicular magnetic film 3 preferably has a magnetic anisotropy energy of $5 \times 10^6$ erg/cc or more, more preferably $1 \times 10^7$ erg/cc or more.

When the magnetic anisotropy energy is below the above range, magnetic fluctuation tends to arise on the surface of the second perpendicular magnetic film 6, which causes an increase in noise. In addition, coercive force (Hc) and magnetic anisotropy field (Hk) are reduced, and thermal stability is lowered.

The second undercoat film 4 is provided to enhance the crystal orientation of the non-magnetic intermediate film 5 and the second perpendicular magnetic film 6 and to enhance the perpendicular magnetic anisotropy of the film 6. The film 4 preferably comprises a material of hcp structure.

The second undercoat film 4 may be formed of a material containing one or more species selected from among Ru, Ti, Zr, C, Re, Y, Gd, Tb, and Hf as a primary component. The material may comprise any one of Ru, Ti, Zr, C, Re, Y, Gd, and Tb as a single element. Alternatively, the material may comprise an alloy containing any of these elements and Cr, Co, Fe, or Ni, in consideration of lattice matching of the film 4 with respect to the films adjacent thereto (i.e., the first perpendicular magnetic film 3 and the second undercoat film 4).

The second undercoat film 4 preferably has a thickness of 1,000 Å or less. When the thickness exceeds the above range, crystal grains become large in the film 4, and this causes crystal grains to become large in the non-magnetic intermediate film 5 and the second perpendicular magnetic film 6, resulting in deterioration of noise characteristics.

In an embodiment of the present invention, the second undercoat film may be omitted.

The non-magnetic intermediate film 5 is provided to enhance the crystal orientation of the second perpendicular magnetic film 6 formed on the film 5 and to enhance the perpendicular magnetic anisotropy of the second perpendicular magnetic film 6. The film 5 preferably comprises a non-magnetic material of hcp structure.

The material of the non-magnetic intermediate film 5 preferably comprises any alloy selected from among CoCr, CoCrPt, CoCrTa, and CoCrPtX' (X': one or more species selected from among Ta, Zr, Nb, Cu, Re, Ni, and B).

Particularly, the material of the non-magnetic intermediate film 5 comprises, as a primary component, a Co alloy containing Cr: 25–50 at %, Pt: 0–15 at %, X': 0–10 at %, and Co: the balance is preferred.

The non-magnetic intermediate film 5 may either have a single-layer structure or a multi-layer structure. In the case of a multi-layer structure, the film 5 may be formed of a plurality of layers comprising a single material, or of a plurality of layers of different materials selected from the above-described materials.

The non-magnetic intermediate film 5 preferably has a thickness of 500 Å or less.

When the thickness is in excess of 500 Å, crystal grains tend to become large in the non-magnetic intermediate film 5 and magnetic grains may become large in the second perpendicular magnetic film 6, and thus noise characteristics tend to deteriorate.

The non-magnetic intermediate film 5 more preferably has a thickness of 50–200 Å. Even when the non-magnetic intermediate film 5 has a multi-layer structure, the film has an overall thickness of 500 Å or less, preferably 50–200 Å.

In an embodiment of the present invention, the non-magnetic intermediate film may be omitted.

The second perpendicular magnetic film 6 comprises a magnetic material in which most of the easy-magnetization axes are oriented vertically with respect to the substrate. The material of the film 6 preferably comprises any alloy selected from among CoCrPt, CoCrTa, and CoCrPtX (X: one or more species selected from among Ta, Zr, Cu, Re, Nb, Si, Ge, and B).

The second perpendicular magnetic film 6 more preferably comprises a Co alloy containing Cr: 13–25 at %, Pt: 0–18 at % (more preferably 0–15 at %), X: 0–5 at %, and Co: the balance. When the amount of each component falls outside the above range, noise characteristics deteriorate or read-write output decreases, which is unsatisfactory.

The second perpendicular magnetic film 6 preferably has a thickness of 100–1,000 Å. When the thickness of the film 6 is less than 100 Å, insufficient magnetic flux is obtained, thereby reducing read-write output and deteriorating noise characteristics such as SNR.

In contrast, when the thickness of the second perpendicular magnetic film 6 is in excess of 1,000 Å, magnetic grains in the film 6 become large, and thus noise characteristics deteriorate, which is unsatisfactory.

The second perpendicular magnetic film 6 more preferably has a thickness of 200–700 Å, more preferably 100–500 Å. When the thickness falls within this range, read-write output can be further enhanced, and magnetic grains in the film 6 can be prevented from becoming large, thereby improving noise characteristics.

In another magnetic recording medium of an embodiment of the present invention, the second perpendicular magnetic film 6 is a low magnetic anisotropy film in which the magnetic anisotropy energy is determined to be lower than that of the first perpendicular magnetic film.

When the magnetic anisotropy energy exceeds the above range (i.e., when the magnetic anisotropy energy is equal to or higher than that of the first perpendicular magnetic film), the boundaries of recording magnetic domains become non-linear; i.e., the boundaries tend to become jagged. Therefore, when recording density is increased, the effect of noise generated from the boundaries of the magnetic domains becomes large, and thus noise characteristics of the magnetic recording medium deteriorate.

The protective film 7 is provided to prevent corrosion of the second perpendicular magnetic film 6, to protect the surface of the medium from any damage when a head contacts the medium, and to enhance lubrication between the head and the medium. Conventional materials may be employed for the film 7, and examples of the materials include a single composition of C, $SiO_2$, or $ZrO_2$, a composition comprising C, $SiO_2$, or $ZrO_2$ as a primary component and other elements.

The protective film 7 preferably has a thickness of 10–100 Å.

On the surface of the protective film 7, a lubrication film formed of perfluoropolyether, fluorinated alcohol, or fluorinated carboxylic acid is preferably provided.

In order to produce the magnetic recording medium comprising the above-described structure, firstly, the first undercoat film 2, the first perpendicular magnetic film 3, the second undercoat film 4, the non-magnetic intermediate film 5, and the second perpendicular magnetic film 6 are successively formed on the substrate 1 by means of a technique such as sputtering, vacuum deposition, or ion-plating. Subsequently, the protective film 7 may be formed on the film 6 by means of plasma CVD, an ion-beam method, or sputtering.

Incidentally, in order to form a lubrication film, a customary method such as dipping or spin coating may be employed.

In another magnetic recording medium of an embodiment of the present invention, the second perpendicular magnetic film 6 of low magnetic anisotropy is provided on the first perpendicular magnetic film 3 of high magnetic anisotropy, and thus noise characteristics can be enhanced.

In the medium comprising the above-described structure, noise characteristics can be enhanced for the reasons described below.

In general, a magnetic recording medium comprising a magnetic film of high magnetic anisotropy has a large coercive force, and thus read-write output can be enhanced. However, the boundaries of recording magnetic domains become non-linear; i.e., the boundaries tend to be jagged. Therefore, when recording density is increased, magnetic reversal occurs in the vicinity of the boundaries, thereby forming unclear boundaries. As a result, noise tends to increase.

In contrast, in a magnetic recording medium comprising a magnetic film of low magnetic anisotropy, recording magnetic domains having linear boundaries tend to be formed, and thus noise may be suppressed. However, in such a medium, increasing read-write output is difficult compared with a magnetic recording medium comprising a magnetic film of high magnetic anisotropy.

In another magnetic recording medium of an embodiment of the present invention, the first perpendicular magnetic film 3 of high magnetic anisotropy is provided under the second perpendicular magnetic film 6 of low magnetic anisotropy, and thus the distance between the film 3 and a magnetic head is long during read-write.

Therefore, even when the boundaries of recording magnetic domains become non-linear and magnetic reversal tends to occur in the first perpendicular magnetic film 3 of high magnetic anisotropy, noise is rarely detected and noise levels can be suppressed.

Meanwhile, the distance between the second perpendicular magnetic film 6 and a magnetic head is short during read-write, and thus noise tends to be detected. However, since the first perpendicular magnetic film 3 of high magnetic anisotropy is provided, magnetic fluctuation can be prevented in the second perpendicular magnetic film 6 due to magnetic bonding between the film 3 and the film 6. Thus, an increase in noise can be prevented.

In addition, since the magnetic anisotropy of the second perpendicular magnetic film 6 is determined to be lower, the boundaries of recording magnetic domains in the film 6 become linear and noise attributed to the film 6 can be suppressed.

Furthermore, read-write output can be increased, because the first perpendicular magnetic film 3, which has high magnetic anisotropy and a large coercive force, is provided.

Since the second perpendicular magnetic film 6 is provided (the distance between the film and a magnetic head is short during read-write), spacing loss can be reduced and read-write output can further be increased even when recording density is increased.

As described above, in the magnetic recording medium of the embodiment, noise can be suppressed, read-write output level can be increased, and noise characteristics, such as SNR, can be enhanced. Therefore, recording density can be increased.

In general, thermal stability is excellent in a medium that has large magnetocrystalline anisotropy (Ku). This is because when magnetocrystalline anisotropy (Ku) is strong, the gradient in the vicinity of residual magnetization is low in the hysteresis loop and demagnetization rarely occurs.

In another magnetic recording medium of an embodiment of the present invention, since coercive force (Hc) and magnetic anisotropy field (Hk) are increased due to the provision of the first perpendicular magnetic film 3 of high magnetic anisotropy, thermal stability can be enhanced.

As used herein, the term "thermal stability" refers to the degree of difficulty in occurrence of thermal decay.

The term "thermal decay" refers to a phenomenon in which recording bits become unstable and recorded data are thermally lost. When such a phenomenon occurs, read-write output of recorded data may decrease with passage of time.

In the magnetic recording medium, the non-magnetic intermediate film 5 of hcp structure is provided between the second undercoat film 4 and the second perpendicular magnetic film 6. Thus, disturbance of crystal orientation in the film 6 is prevented at initial growth thereof. As a result, the crystal orientation and magnetic anisotropy of the film 6 are improved, coercive force and magnetic anisotropy field are easily set at a predetermined value, and noise characteristics and thermal stability can be reliably enhanced.

The improvement of crystal orientation of the second perpendicular magnetic film 6 may be attributed to enhancement of lattice matching between the film 6 and the non-magnetic intermediate film 5 which is made to have an hcp structure.

Since the non-magnetic intermediate film 5 is provided, the distance between the first perpendicular magnetic film 3 and the second perpendicular magnetic film 6 is long. Therefore, the distance between the film 3 and a magnetic head becomes long during read-write, and thus noise levels can be reduced.

Figure 2:
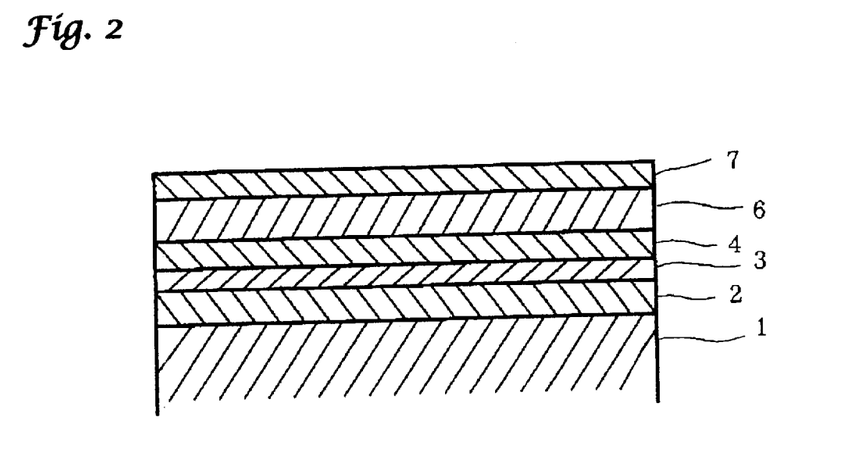
FIG. 2 is a partial sectional view showing another embodiment of the magnetic recording medium of the present invention.
Figure 3:
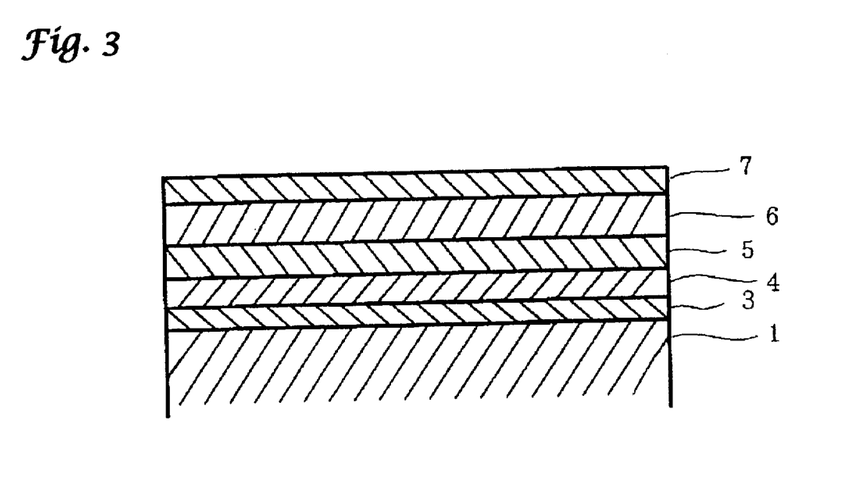
FIG. 3 is a partial sectional view showing yet another embodiment of the magnetic recording medium of the present invention.

The magnetic recording medium having the above-described structure comprises the non-magnetic intermediate film 5 which is formed of a material of hcp structure. However, the magnetic recording medium of the present invention is not particularly limited to the above-described embodiment, and the non-magnetic intermediate film 5 may be omitted. The magnetic recording medium not comprising the non-magnetic intermediate film 5 is shown in FIG. 2. Both the second undercoat film and the non-magnetic intermediate film 5 may be omitted. The second perpendicular magnetic film 6 are formed directly on the first perpendicular magnetic film 3. Accordingly, the first undercoat film 2 is provided in the above-described magnetic recording medium, but the film 2 may be omitted in the present invention. The magnetic recording medium not comprising the first undercoat film 2 is shown in FIG. 3.

As used herein, the term "primary component" refers to a component which is contained in an amount of more than 50 at %.

It is preferable to form a soft magnetic layer (soft-back layer) between the substrate 1 and the first undercoat film 2.

The material of the soft magnetic layer comprises material containing Co or Fe (e.g., alloys of CoZrNb, CoTaNb, permalloy, sendust FeTaC).

The thickness of the soft magnetic layer is preferably 50 nm or more (preferably 100 nm or more, more preferably 200 nm or more).

When the thickness of the soft magnetic layer is below the above range, it becomes difficult to form the loop-like magnetization curves.

EXAMPLES

The present invention will next be described in detail by way of specific examples. The magnetic recording medium shown in FIG. 1, 2 or 3 was produced as follows. Unless otherwise indicated herein, all parts, percents, ratios and the like are by weight.

Test Example 1

A glass substrate 1 (diameter: 95 mm, thickness: 0.8 mm) was set in the chamber of a DC magnetron sputtering apparatus (model 3010: product of ANELVA Corporation). Subsequently, the chamber was evacuated to $2 \times 10^{-7}$ Pa. Thereafter, on the substrate 1, a first undercoat film 2 comprising SiN, a first perpendicular magnetic film 3 comprising TbFeCo, a second undercoat film 4 comprising Ru, a non-magnetic intermediate film 5 comprising Co-35at%Cr-5at%Pt (Co35Cr5Pt), and a second perpendicular magnetic film 6 comprising Co-20 at%Cr-10 at%Pt-3 at%Ta (Co20Cr10Pt3Ta) were sequentially formed by sputtering. After forming a first perpendicular magnetic film 3, the substrate 1 was heated to 200° C.

On the second perpendicular magnetic film 6, a carbon protective film 7 having a thickness of 70 Å was formed through plasma CVD.

On the carbon protective film 7, a perfluoroether lubrication film (thickness: 20 Å) was formed through dipping.

In the magnetic recording medium, the magnetic anisotropy energy of the first perpendicular magnetic film 3 was determined to be higher than that of the second perpendicular magnetic film 6.

Test Example 2

The procedure of Test Example 1 was repeated, except that the first undercoat film 2 and the first perpendicular magnetic film 3 were not provided to produce a magnetic recording medium.

Test Examples 3 through 6

The procedure of Test Example 1 was repeated, except that different materials were employed for the first undercoat film 2 and the first perpendicular magnetic film 3 to produce a magnetic recording medium.

Test Examples 7 through 9

The procedure of Test Example 1 was repeated, except that the thickness of the first perpendicular magnetic film 3 was changed to produce a magnetic recording medium.

Test Examples 10 and 11

The procedure of Test Example 1 was repeated, except that a different material was employed for the first perpendicular magnetic film 3 to produce a magnetic recording medium.

Test Examples 12 through 14

The procedure of Test Example 1 was repeated, except that a different material was employed for the second undercoat film 4 to produce a magnetic recording medium.

Test Examples 15 through 17

The procedure of Test Example 1 was repeated, except that the thickness of the non-magnetic intermediate film 5 was changed to produce a magnetic recording medium.

Test Examples 18 through 20

The procedure of Test Example 1 was repeated, except that the composition of the second perpendicular magnetic film 6 was changed to produce a magnetic recording medium.

Test Examples 21 through 24

The procedure of Test Example 1 was repeated, except that the thickness of the second perpendicular magnetic film 6 was changed to produce a magnetic recording medium.

Test Example 25

The procedure of Test Example 1 was repeated, except that the first undercoat film 2 was not provided to produce a magnetic recording medium.

Test Example 26

The procedure of Test Example 1 was repeated, except that the non-magnetic intermediate film 5 was not provided to produce a magnetic recording medium.

Test Example 27

The procedure of Test Example 1 was repeated, except that the first undercoat film 2 and the first perpendicular magnetic film 3 were not provided to produce a magnetic recording medium.

The magnetic anisotropy energy of the perpendicular magnetic film 6 was determined at $7 \times 10^6$ erg/cc.

Test Example 28

The procedure of Test Example 1 was repeated, except that the first undercoat film 2 and the first perpendicular magnetic film 3 were not provided to produce a magnetic recording medium.

The magnetic anisotropy energy of the perpendicular magnetic film 6 was determined at $1 \times 10^6$ erg/cc.

Test Example 29

The procedure of Test Example 1 was repeated, except that the second undercoat film 4 and non-magnetic intermediate film 5 were not provided and different materials were employed for the first perpendicular magnetic film 3.

Test Examples 30 through 31

The procedure of Test Example 1 was repeated, except that the different materials were employed for the first undercoat film 2 and the first perpendicular magnetic film 3.

Test Example 32

The procedure of Test Example 1 was repeated, except that the different materials and thickness were employed for the second perpendicular magnetic film 6.

Test Example 33

The procedure of Text Example 1 was repeated, except that the soft-back layer was provided and different materials and thickness were employed for the second perpendicular magnetic film 6.

The magnetic recording media produced in the above test examples were subjected to measurement of magnetostatic characteristics by use of a Kerr effect measurement apparatus. In addition, the magnetic recording media were subjected to measurement of electromagnetic conversion characteristics, e.g., signal to noise ratio (SNR) by use of read/write analyzer RWA1632 and spin stand S1701MP (products of GURIK). In order to evaluate SNR, measurement was performed by use of a complex-type thin film magnetic recording head containing a giant magnetoresistance (GMR) element at a read-write portion as a magnetic head, and track-recording density was set at 150 kFCI. Table 1 shows the results of measurement of the magnetic recording media in the above-described Test Examples in terms of magnetostatic characteristics and SNR.

In addition, the magnetic recording media were subjected to measurement of thermal decay by use of the aforementioned complex-type thin film magnetic recording head as a magnetic head at a track recording density of 150 KFCI and a temperature of 25° C. In order to obtain thermal decay, the rate of reduction in output (%/decade) with respect to output immediately after recording was calculated on the basis of $\log\{(S_0-S)\times 100/S_0\}/3$. The results are shown in Table 1. As used herein, $S_0$ represents output immediately after signals are written in the magnetic recording medium, and S represents output 1,000 seconds after the writing of the signals.

In Table 1, the symbol "element A/element B" refers to a multi-layer film which is formed by alternately and repeatedly stacking layers of elements A and B.

TABLE 1-1

|  | First undercoat film | | First perpendicular magnetic film | | Second undercoat film | | Non-magnetic intermediate film | |
| --- | --- | --- | --- | --- | --- | --- | --- | --- |
|  | Composition | Thickness (Å) | Composition | Thickness (Å) | Composition | Thickness (Å) | Composition | Thickness (Å) |
| Test Ex.1 | SiN | 200 | TbFeCo | 50 | Ru | 100 | Co35Cr5Pt | 100 |
| Test Ex. 2 | — | — | — | — | Ru | 100 | Co35Cr5Pt | 100 |
| Test Ex. 3 | Pt | 100 | Co/Pt | 50 | Ru | 100 | Co35Cr5Pt | 100 |
| Test Ex. 4 | Pt | 100 | Co/Pd | 50 | Ru | 100 | Co35Cr5Pt | 100 |
| Test Ex. 5 | Pt | 100 | CoCr/Pt | 50 | Ru | 100 | Co35Cr5Pt | 100 |
| Test Ex. 6 | Pt | 100 | CoCr/Pd | 50 | Ru | 100 | Co35Cr5Pt | 100 |
| Test Ex. 7 | SiN | 200 | TbFeCo | 10 | Ru | 100 | Co35Cr5Pt | 100 |
| Test Ex. 8 | SiN | 200 | TbFeCo | 100 | Ru | 100 | Co35Cr5Pt | 100 |
| Test Ex. 9 | SiN | 200 | TbFeCo | 200 | Ru | 100 | Co35Cr5Pt | 100 |
| Test Ex. 10 | SiN | 200 | GdCo | 50 | Ru | 100 | Co35Cr5Pt | 100 |
| Test Ex. 11 | SiN | 200 | NdDyFeCo | 50 | Ru | 100 | Co35Cr5Pt | 100 |
| Test Ex. 12 | SiN | 200 | TbFeCo | 50 | Ti | 100 | Co35Cr5Pt | 100 |
| Test Ex. 13 | SiN | 200 | TbFeCo | 50 | Zr | 100 | Co35Cr5Pt | 100 |
| Test Ex. 14 | SiN | 200 | TbFeCo | 50 | C | 100 | Co35Cr5Pt | 100 |

|  | Second perpendicular magnetic film | | First perpendicular magnetic film | | | Electromagnetic conversion characteristics | Thermal decay |
| --- | --- | --- | --- | --- | --- | --- | --- |
|  | Composition | Thickness (Å) | Coercive force (Oe) | Anisotrophy energy (erg/cc) | Mr/Ms (–) | SNR (db) | (%/decade) |
| Test Ex.1 | Co20Cr10Pt3Ta | 500 | 4500 | 2.0E + 07 | 0.99 | 22.20 | 0.05 |
| Test | Co20Cr10Pt3Ta | 500 | 3500 |  |  | 18.60 | 0.40 |

TABLE 1-1-continued

| | | | | | | | |
|---|---|---|---|---|---|---|---|
| Test Ex. 2 | | | | | | | |
| Test Ex. 3 | Co20Cr10Pt3Ta | 500 | 4200 | 4.0E + 07 | 0.97 | 20.10 | 0.10 |
| Test Ex. 4 | Co20Cr10Pt3Ta | 500 | 4200 | | 0.99 | 20.20 | 0.08 |
| Test Ex. 5 | Co20Cr10Pt3Ta | 500 | 4200 | 1.0E + 07 | 0.96 | 20.30 | 0.12 |
| Test Ex. 6 | Co20Cr10Pt3Ta | 500 | 4200 | | 0.96 | 20.20 | 0.12 |
| Test Ex. 7 | Co20Cr10Pt3Ta | 500 | 3800 | | 0.91 | 22.00 | 0.08 |
| Test Ex. 8 | Co20Cr10Pt3Ta | 500 | 4100 | | 0.99 | 20.50 | 0.03 |
| Test Ex. 9 | Co20Cr10Pt3Ta | 500 | 4300 | | 1.00 | 17.50 | 0.02 |
| Test Ex. 10 | Co20Cr10Pt3Ta | 500 | | 1.5E + 07 | 0.96 | 20.60 | 0.05 |
| Test Ex. 11 | Co20Cr10Pt3Ta | 500 | | 1.0E + 07 | 0.95 | 20.40 | 0.05 |
| Test Ex. 12 | Co20Cr10Pt3Ta | 500 | 4300 | | | 20.20 | 0.04 |
| Test Ex. 13 | Co20Cr10Pt3Ta | 500 | 4000 | | | 20.20 | 0.04 |
| Test Ex. 14 | Co20Cr10Pt3Ta | 500 | 4200 | | | 21.50 | 0.06 |

TABLE 1-2

| | First undercoat film | | First perpendicular magnetic film | | Second undercoat film | | Non-magnetic intermediate film | |
|---|---|---|---|---|---|---|---|---|
| | Composition | Thickness (Å) | Composition | Thickness (Å) | Composition | Thickness (Å) | Composition | Thickness (Å) |
| Test Ex. 15 | SiN | 200 | TbFeCo | 50 | Ru | 100 | Co35Cr5Pt | 20 |
| Test Ex. 16 | SiN | 200 | TbFeCo | 50 | Ru | 100 | Co35Cr5Pt | 500 |
| Test Ex. 17 | SiN | 200 | TbFeCo | 50 | Ru | 100 | Co35Cr5Pt | 800 |
| Test Ex. 18 | SiN | 200 | TbFeCo | 50 | Ru | 100 | Co35Cr5Pt | 100 |
| Test Ex. 19 | SiN | 200 | TbFeCo | 50 | Ru | 100 | Co35Cr5Pt | 100 |
| Test Ex. 20 | SiN | 200 | TbFeCo | 50 | Ru | 100 | Co35Cr5Pt | 100 |
| Test Ex. 21 | SiN | 200 | TbFeCo | 50 | Ru | 100 | Co35Cr5Pt | 100 |
| Test Ex. 22 | SiN | 200 | TbFeCo | 50 | Ru | 100 | Co35Cr5Pt | 100 |
| Test Ex. 23 | SiN | 200 | TbFeCo | 50 | Ru | 100 | Co35Cr5Pt | 100 |
| Test Ex. 24 | SiN | 200 | TbFeCo | 50 | Ru | 100 | Co35Cr5Pt | 100 |
| Test Ex. 25 | — | — | TbFeCo | 50 | Ru | 100 | Co35Cr5Pt | 100 |
| Test Ex. 26 | SiN | 200 | TbFeCo | 50 | Ru | 100 | — | — |
| Test Ex. 27 | — | — | — | — | Ru | 100 | Co35Cr5Pt | 100 |
| Test Ex. 28 | — | — | — | — | Ru | 100 | Co35Cr5Pt | 100 |

| | Second perpendicular magnetic film | | | First perpendicular magnetic film | | Electro-magnetic conversion characteristics | |
|---|---|---|---|---|---|---|---|
| | Composition | Thickness (Å) | Coercive force (Oe) | Anisotrophy energy (erg/cc) | Mr/Ms (—) | SNR (db) | Thermal decay (%/decade) |
| Test Ex. 15 | Co20Cr10Pt3Ta | 500 | 3900 | | | 22.30 | 0.04 |
| Test Ex. 16 | Co20Cr10Pt3Ta | 500 | 4300 | | | 21.80 | 0.07 |

TABLE 1-2-continued

| | | | | | | | |
|---|---|---|---|---|---|---|---|
| Test Ex. 17 | Co20Cr10Pt3Ta | 500 | 3600 | | | 17.80 | 0.15 |
| Test Ex. 18 | Co21Cr10Pt | 500 | 4400 | | | 20.40 | 0.04 |
| Test Ex. 19 | Co22Cr12Pt4B | 500 | 4400 | | | 22.20 | 0.05 |
| Test Ex. 20 | Co21Cr8Pt2Ta2Zr | 500 | 4000 | | | 20.90 | 0.06 |
| Test Ex. 21 | Co20Cr10Pt3Ta | 50 | 2600 | | | 15.80 | 0.05 |
| Test Ex. 22 | Co20Cr10Pt3Ta | 100 | 3700 | | | 20.40 | 0.05 |
| Test Ex. 23 | Co20Cr10Pt3Ta | 1000 | 4000 | | | 20.40 | 0.04 |
| Test Ex. 24 | Co20Cr10Pt3Ta | 1500 | 3800 | | | 18.50 | 0.03 |
| Test Ex. 25 | Co20Cr10Pt3Ta | 500 | 4000 | | 0.95 | 21.00 | 0.05 |
| Test Ex. 26 | Co20Cr10Pt3Ta | 500 | 3800 | | | 21.00 | 0.04 |
| Test Ex. 27 | Co20Cr10Pt3Ta | 500 | 3900 | — | — | 18.40 | 0.14 |
| Test Ex. 28 | Co20Cr10Pt3Ta | 500 | 3900 | — | — | 20.80 | 0.38 |

TABLE 1-3

| | Soft back layer | Thickness (Å) | First undercoat film | | First perpendicular magnetic film | | Second undercoat film | | Non-magnetic intermediate film | |
|---|---|---|---|---|---|---|---|---|---|---|
| | | | Composition | Thickness (Å) | Composition | Thickness (Å) | Composition | Thickness (Å) | Composition | Thickness (Å) |
| Test Ex. 29 | — | — | Pt | 200 | CoCr/Pt | 100 | — | — | — | — |
| Test Ex. 30 | — | — | MgO | 100 | FePt | 100 | — | — | — | — |
| Test Ex. 31 | — | — | MgO | 100 | FePt | 100 | Ru | 50 | Co35Cr5Pt | 50 |
| Test Ex. 32 | — | — | Pt | 200 | CoSiO2/Pd | 150 | — | — | — | — |
| Test Ex. 33 | CoZrNB | 3000 | Pt | 200 | CoB/Pd | 150 | — | — | — | — |

| | Second perpendicular magnetic film | | | First perpendicular magnetic film | | Electro-magnetic conversion characteristics SNR (db) | Thermal decay (%/decade) |
|---|---|---|---|---|---|---|---|
| | Composition | Thickness (Å) | Coercive force (Oe) | Anisotrophy energy (erg/cc) | Mr/Ms (−) | | |
| Test Ex. 29 | Co20Cr10Pt3Ta | 300 | 4200 | — | — | 21.5 | 0.03 |
| Test Ex. 30 | Co20Cr10Pt2B | 200 | 5300 | 7.00E + 07 | 0.98 | 22.5 | 0.01 |
| Test Ex. 31 | Co20Cr10Pt2B | 300 | 5700 | — | — | 21.5 | 0.02 |
| Test Ex. 32 | Co20Cr10Pt2B | 200 | 4800 | — | — | 22.9 | 0.04 |
| Test Ex. 33 | Co20Cr10Pt2B | 200 | 5000 | — | — | 20.8 | 0.03 |

*In the column "anisotropy energy," "AE + B" refers to $A \times 10^B$.

As is apparent from Table 1, among Test Examples 1 through 6, the magnetic recording media of Test Examples 1 and 3 through 5 comprising the first perpendicular magnetic film 3 exhibited excellent noise characteristics compared with the magnetic recording medium of Test Example 2 which did not have the first perpendicular magnetic film 3.

Comparison among Test Examples 1 and 7 through 9 revealed that the magnetic recording media of Test Examples 1, 7, and 8 comprising the first perpendicular magnetic film 3 having a thickness of 1–100 Å exhibited excellent noise characteristics compared with the magnetic recording medium of Test Example 9 comprising the film 3 having a thickness outside the above range.

Comparison among Test Examples 1, 10, and 11 revealed that the magnetic recording media comprising the first perpendicular magnetic film 3 formed of different materials shown in Table 1 exhibited excellent noise characteristics.

Comparison among Test Examples 1 and 12 through 14 revealed that the magnetic recording media comprising the second undercoat film 4 formed of different materials shown in Table 1 exhibited excellent noise characteristics.

Comparison among Test Examples 1 and 15 through 17 revealed that the magnetic recording media of Test Examples 1, 15, and 16 comprising the non-magnetic intermediate film 5 having a thickness of 500 Å or less (or the media not comprising the film 5) exhibited excellent noise characteristics compared with the magnetic recording medium of Test Example 17 comprising the film 5 having a thickness outside the above range.

Comparison among Test Examples 1 and 18 through 20 revealed that the magnetic recording media comprising the second perpendicular magnetic film 6 formed of different compositions in the above-described range exhibited excellent noise characteristics.

Comparison among Test Examples 1 and 21 through 24 revealed that the magnetic recording media of Test Examples 1, 22, and 23 comprising the second perpendicular magnetic film 6 having a thickness of 100–1,000 Å exhibited excellent noise characteristics compared with the magnetic recording media of Test Examples 21 and 24 comprising the film 6 having a thickness outside the above range.

Comparison of Test Example 1 with Test Example 25 revealed that, although good noise characteristics can be obtained when a first undercoat film 2 is not provided, a structure with a first undercoat film 2 yields more excellent noise characteristics.

Comparison of Test Example 1 with Test Example 26 revealed that, although good noise characteristics can be obtained when a non-magnetic intermediate film 5 is not provided, a structure with a non-magnetic intermediate film 5 exhibits more excellent noise characteristics.

Comparison among Test Examples 1, 27, and 28 revealed that the magnetic recording medium of Test Example 1, which comprises the first and second perpendicular magnetic films 3 and 6, in which the magnetic anisotropy energy of the film 3 is determined to be higher than that of the film 6, exhibited excellent noise characteristics and thermal stability compared with the magnetic recording media of Test Examples 27 and 28, which did not comprise a first perpendicular magnetic film 3, and exhibited either poor noise characteristics or lower thermal stability.

As described above, the magnetic recording medium of the present invention comprises a substrate, a first perpendicular magnetic film, and a second perpendicular magnetic film in order, in which the magnetic anisotropy energy of the first magnetic film is determined to be higher than that of the second magnetic film. Therefore, in the magnetic recording medium of the present invention, noise can be suppressed, read-write output can be increased, and noise characteristics such as SNR can be enhanced, and thus recording density can be increased.

In the magnetic recording medium of the present invention, a first perpendicular magnetic film of high magnetic anisotropy is provided, and thus coercive force and magnetic anisotropy field can be increased and thermal stability can be enhanced.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a substrate, a first perpendicular magnetic film, and a second perpendicular magnetic film in order, wherein a magnetic anisotropy energy of the first perpendicular magnetic film is higher than that of the second perpendicular magnetic film and the first perpendicular magnetic film comprises any material selected from the group consisting of Co, $CoSiO_2$ ternary alloy, CoB binary alloy, Pt, Pd, Pd alloy, FePt alloy and amorphous alloy containing a rare earth element.

2. A magnetic recording medium according to claim 1, wherein the first perpendicular magnetic film has a magnetic anisotropy energy of $5 \times 10^6$ erg/cc or more.

3. A magnetic recording medium according to claim 1, wherein a ratio of residual magnetization to saturation magnetization in the first perpendicular magnetic film is 0.9 or more.

4. A magnetic recording medium according to claim 2, wherein a ratio of residual magnetization to saturation magnetization in the first perpendicular magnetic film is 0.9 or more.

5. A magnetic recording medium according to claim 1, wherein the first perpendicular magnetic film is a multi-layer film comprising layers of Co material, and Pt or Pd material repeatedly stacked.

6. A magnetic recording medium according to claim 2, wherein the first perpendicular magnetic film is a multi-layer film comprising layers of Co material, and Pt or Pd material repeatedly stacked.

7. A magnetic recording medium according to claim 1, wherein the first perpendicular magnetic film is an amorphous film containing a rare earth element.

8. A magnetic recording medium according to claim 2, wherein the first perpendicular magnetic film is an amorphous film containing a rare earth element.

9. A magnetic recording medium according to claim 1 or 2, wherein the first perpendicular magnetic film comprises an ordered alloy selected from the group consisting of $L1_0$-structured FePt, CoPt or $(Fe_{(1-n)}Co_n)_{50}Pt_{50}$ (n: 0–0.99).

10. A magnetic recording medium according to claim 1, wherein the first perpendicular magnetic film has a thickness of 1–175 Å.

11. A magnetic recording medium according to claim 2, wherein the first perpendicular magnetic film has a thickness of 1–175 Å.

12. A magnetic recording medium according to claim 1, wherein the second perpendicular magnetic film comprises any alloy selected from the group consisting of CoCrPt, CoCrTa, and CoCrPtX, wherein X is one or more species selected from the group consisting of Ta, Zr, Cu, Re, Nb, Si, Ge, and B.

13. A magnetic recording medium according to claim 2, wherein the second perpendicular magnetic film comprises any alloy selected from the group consisting of CoCrPt, CoCrTa, and CoCrPtX, wherein X is one or more species selected from the group consisting of Ta, Zr, Cu, Re, Nb, Si, Ge, and B.

14. A magnetic recording medium according to claim 1, wherein a non-magnetic intermediate film of hcp structure is provided under the second perpendicular magnetic film.

15. A magnetic recording medium according to claim 2, wherein a non-magnetic intermediate film of hcp structure is provided under the second perpendicular magnetic film.

16. A magnetic recording medium according to claim 1 or 2, wherein a first undercoat film is present between the substrate and the first perpendicular magnetic film, and a soft-back layer is formed under the first undercoat film.

17. A magnetic recording medium according to claim 1, wherein the first perpendicular magnetic film is an amorphous alloy containing a rare earth element and the amorphous alloy is one or more materials selected from the group consisting of TbFeCo alloy, GdCo alloy and NdDyFeCo alloy.

* * * * *